US006924053B2

(12) United States Patent
McElroy

(10) Patent No.: US 6,924,053 B2
(45) Date of Patent: Aug. 2, 2005

(54) SOLID OXIDE REGENERATIVE FUEL CELL WITH SELECTIVE ANODE TAIL GAS CIRCULATION

(75) Inventor: James Frederick McElroy, Suffield, CT (US)

(73) Assignee: Ion America Corporation, Moffett Field, CA (US)

( * ) Notice: Subject to any disclaimer, the term of this patent is extended or adjusted under 35 U.S.C. 154(b) by 112 days.

(21) Appl. No.: 10/394,203

(22) Filed: Mar. 24, 2003

(65) Prior Publication Data

US 2004/0191597 A1 Sep. 30, 2004

(51) Int. Cl.[7] .............................................. H01M 8/04
(52) U.S. Cl. ............................ 429/26; 429/20; 429/30; 429/38
(58) Field of Search ........................... 429/26, 21, 17, 429/30, 34, 12, 20, 120, 58; 165/6, 7; 96/134, 146, 150, 182, 235, 242; 55/309.1; 48/127.9

(56) References Cited

U.S. PATENT DOCUMENTS

| | | |
|---|---|---|
| 4,792,502 A | 12/1988 | Trocciola et al. |
| 4,898,792 A | 2/1990 | Singh et al. |
| 4,983,471 A | 1/1991 | Reichner et al. |
| 5,047,299 A | 9/1991 | Shockling |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |
| 5,498,487 A | 3/1996 | Ruka et al. |
| 5,501,914 A | 3/1996 | Satake et al. |
| 5,505,824 A | 4/1996 | McElroy |
| 5,527,631 A | 6/1996 | Singh et al. |
| 5,573,867 A | 11/1996 | Zafred et al. |
| 5,601,937 A | 2/1997 | Isenberg |
| 5,686,196 A | 11/1997 | Singh et al. |
| 5,733,675 A | 3/1998 | Dederer et al. |
| 5,741,605 A | 4/1998 | Gillett et al. |
| 5,955,039 A | 9/1999 | Dowdy |
| 6,013,385 A | 1/2000 | DuBose |
| 6,280,865 B1 | 8/2001 | Eisman et al. |
| 6,329,090 B1 | 12/2001 | McElroy et al. |
| 6,403,245 B1 | 6/2002 | Hunt |
| 6,436,562 B1 * | 8/2002 | DuBose ....................... 429/13 |
| 6,451,466 B1 | 9/2002 | Grasso et al. |
| 6,623,880 B1 * | 9/2003 | Geisbrecht et al. ........... 429/12 |
| 6,821,663 B2 | 11/2004 | McElroy et al. |
| 2001/0049035 A1 | 12/2001 | Haltiner, Jr. et al. |
| 2002/0028362 A1 | 3/2002 | Prediger et al. |
| 2002/0106544 A1 | 8/2002 | Noetzel et al. |
| 2003/0162067 A1 | 8/2003 | McElroy |
| 2003/0196893 A1 | 10/2003 | McElroy et al. |
| 2004/0081859 A1 * | 4/2004 | McElroy et al. ............... 429/1 |
| 2004/0224193 A1 | 11/2004 | Mitlitsky et al. |

FOREIGN PATENT DOCUMENTS

WO    WO 2004/093214    10/2004

OTHER PUBLICATIONS

U.S. Appl. No. 10/394,202.
U.S. Appl. No. 10/446,704, filed May 29, 2003.
U.S. Appl. No. 10/653,240, filed Sep. 3, 2003.

* cited by examiner

*Primary Examiner*—Raymond Alejandro
(74) *Attorney, Agent, or Firm*—Foley & Lardner LLP

(57) ABSTRACT

A solid oxide fuel cell system includes a solid oxide fuel cell stack and a hydrogen recovery unit connected to a fuel supply inlet conduit and to a fuel exhaust outlet conduit. The hydrogen recovery unit is adapted to selectively transfer at least a portion of hydrogen from the fuel exhaust stream to the hydrocarbon fuel inlet stream.

27 Claims, 2 Drawing Sheets

SOLID OXIDE REGENERATIVE FUEL CELL WITH SELECTIVE ANODE TAIL GAS CIRCULATION

BACKGROUND OF THE INVENTION

The present invention is generally directed to Solid Oxide Fuel Cells (SOFC's), and more specifically to SOFC's having a circulation of a portion of the anode tail gas (i.e., exhaust).

The circulation of a portion of the anode exhaust is known in the solid oxide fuel cell field. This technique is used to provide water to the hydrocarbon fuel inlet of the SOFC to support the steam reforming of the hydrocarbon fuel. Two methods are known for conducting this anode circulation.

In the first method, a portion of the anode exhaust is simply injected back to the SOFC fuel inlet by aspiration or with a mechanical blower. In this case the composition of the anode inlet injected gas stream is similar to the anode exhaust stream. The composition of the exhaust stream is a function of the type of fuel used, the effectiveness of the reforming process, the fuel stoichiometry, and the circulation rate. The composition of the anode exhaust will typically contain water, carbon dioxide and non reacted fuel (i.e., hydrogen, carbon monoxide, and primary fuel feedstock).

In the second method, the anode exhaust is mixed with a portion of the cathode exhaust and a portion of this gas stream is injected into the SOFC fuel inlet by aspiration or with a mechanical blower. In this case, the composition of the anode inlet injected gas stream is modified from the anode exhaust. In general, the composition of the anode inlet injected gas, resulting from partial combining the anode and cathode exhausts, will have a lower fuel content (i.e., hydrogen, carbon monoxide, and primary fuel feedstock) and higher water and carbon dioxide content. Additionally, if as typical, the cathode oxygen source is from ambient air, there will be a quantity of nitrogen in the anode inlet injected gas not normally existent within the anode inlet injected gas from simple partial anode exhaust circulation.

SUMMARY OF THE INVENTION

One preferred embodiment of the present invention provides a solid oxide fuel cell system, comprising a solid oxide fuel cell stack, a fuel supply inlet conduit adapted to provide a hydrocarbon fuel inlet stream into the solid oxide fuel cell stack and a fuel exhaust outlet conduit adapted to remove a fuel exhaust stream from the solid oxide fuel cell stack. The system also includes a water vapor and enthalpy recovery unit operatively connected to the fuel supply inlet conduit and to the fuel exhaust outlet conduit. The water vapor and enthalpy recovery unit is adapted to selectively transfer at least a portion of water vapor and heat from the fuel exhaust stream to the hydrocarbon fuel inlet stream. The system also includes a hydrogen recovery unit connected to the fuel supply inlet conduit and to the fuel exhaust outlet conduit. The hydrogen recovery unit is adapted to selectively transfer at least a portion of hydrogen from the fuel exhaust stream to the hydrocarbon fuel inlet stream.

Another preferred embodiment of the present invention provides a solid oxide fuel cell system, comprising a solid oxide fuel cell stack, a fuel supply inlet conduit adapted to provide a hydrocarbon fuel inlet stream into the solid oxide fuel cell stack, a fuel exhaust outlet conduit adapted to remove a fuel exhaust stream from the solid oxide fuel cell stack, and a fuel exhaust processing subsystem operatively connected to the fuel supply inlet conduit and to the fuel exhaust outlet conduit. The fuel exhaust processing subsystem comprises: a carbon dioxide scrubbing unit which is adapted to remove at least a portion of carbon dioxide present in the fuel exhaust stream to form a scrubbed fuel exhaust stream; a water vapor recovery unit which is adapted to transfer at least a portion of water vapor from the scrubbed fuel exhaust stream to the hydrocarbon fuel inlet stream; and a hydrogen recovery unit which is adapted to transfer at least a portion of hydrogen from the scrubbed fuel exhaust stream to the hydrocarbon fuel inlet stream.

Another preferred embodiment of the present invention provides a method of operating a solid oxide fuel cell system, comprising providing a hydrocarbon fuel inlet stream into a solid oxide fuel cell stack and removing fuel exhaust stream from the solid oxide fuel cell stack. The method also comprises recovering at least a portion of water vapor and heat from the fuel exhaust stream and providing the at least a portion of the recovered water vapor and heat into the hydrocarbon fuel inlet stream being provided into the solid oxide fuel cell stack. The method also comprises recovering at least a portion of hydrogen from the fuel exhaust stream, and separately providing the at least a portion of the recovered hydrogen into the hydrocarbon fuel inlet stream being provided into the solid oxide fuel cell stack.

Another preferred embodiment of the present invention provides a method of operating a solid oxide fuel cell system, comprising providing a hydrocarbon fuel inlet stream into a solid oxide fuel cell stack, removing a fuel exhaust stream from the solid oxide fuel cell stack, removing at least a portion of carbon dioxide present in the fuel exhaust stream to form a scrubbed fuel exhaust stream, and providing at least a portion of the scrubbed fuel exhaust stream into the hydrocarbon fuel inlet stream.

DETAILED DESCRIPTION OF THE PREFERRED EMBODIMENTS

Figure 1:
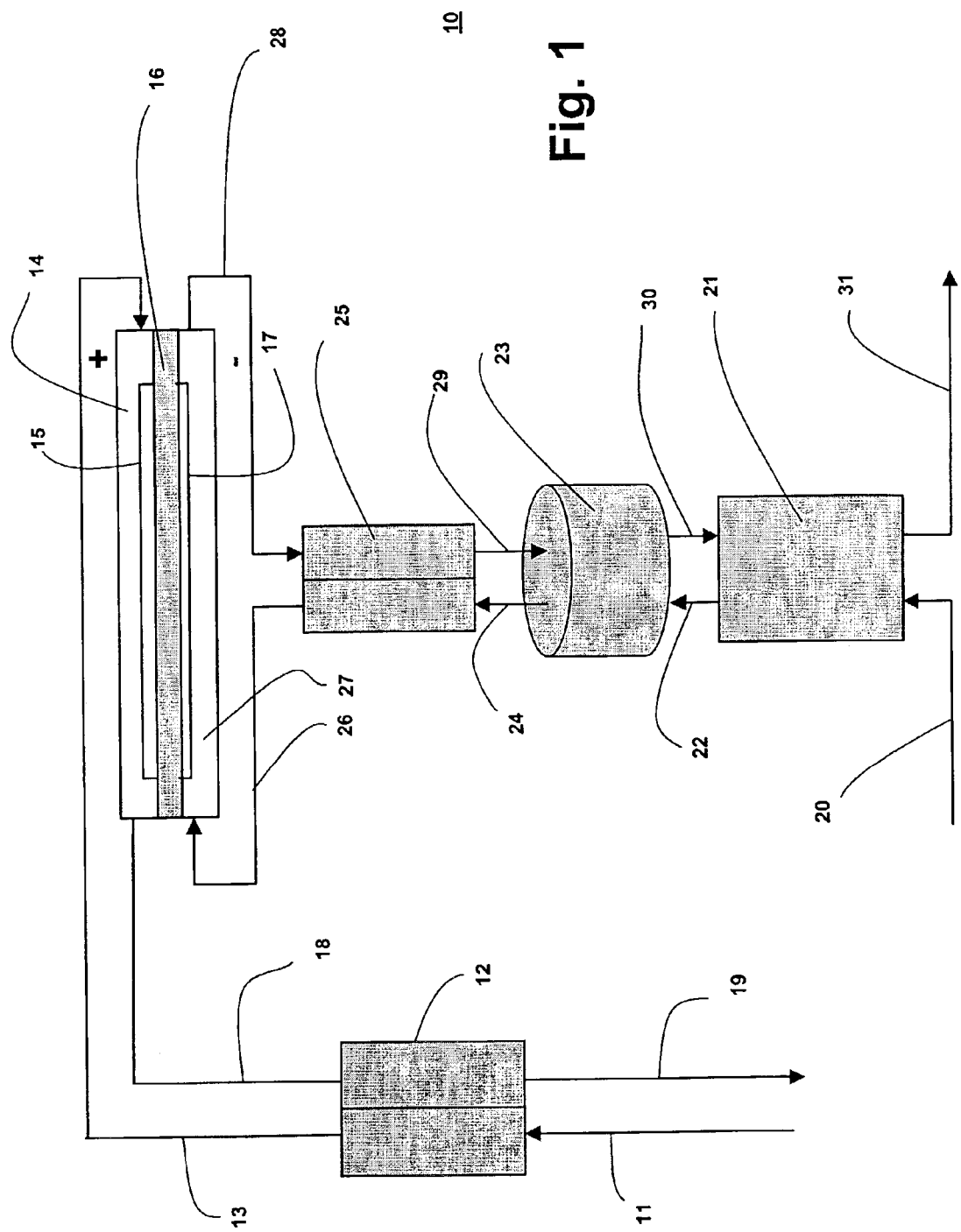
FIG. 1 is a system schematic of the major SOFC components of the first preferred embodiment of the present invention.

The present inventor has realized that even with the injection of exhaust gases into the anode inlet, several problems in conducting internal reforming within the active area of the SOFC cells still exists in the prior art methods.

First, because the SOFC operates at an elevated temperature, steam reforming of the fuel (i.e., methane as an example) occurs within the SOFC stack fuel inlet manifold. As much as 80% of the reforming can be completed before the fuel gas mixture reaches the active cell area. This negates much of the significant advantage of endothermic internal reforming relative to the lowering of cooling airflow requirements and the leveling of the thermal gradients.

Second, even if the fuel steam reformation within the SOFC fuel inlet manifold was avoided, the fuel steam reaction can overwhelm the fuel cell oxidation reaction with most of the reforming occurring near the fuel inlet active area leading to negative results. These negative results include misdistribution of current density, higher thermal gradients and poorer performance.

Third, the gas injected into the anode inlet contains a significant portion of carbon dioxide or carbon dioxide and nitrogen. This negatively impacts the system performance in two characteristics. A pressure drop across the anode flow field is increased, which in turn increases the blower parasitic power, and the fuel is diluted to a lower partial pressure reducing the cell performance.

The present inventor has realized that a use of selective rather than total circulation of the anode exhaust gas species in a SOFC reduce or eliminate the problems of the prior art methods. The present inventor has devised methods for shifting the methane/steam reforming equilibrium such that reforming within the fuel manifold is minimized and the fuel cell oxidation is encouraged or even preferred over the methane/steam reformation reaction.

The terms anode exhaust, fuel exhaust, anode outlet and fuel outlet are used interchangeably herein. Likewise, the terms anode inlet and fuel inlet are also used interchangeably.

In the selective circulation of the SOFC anode exhaust, only hydrogen and water are sequestered from the fuel or anode exhaust or outlet stream and injected into the SOFC fuel inlet stream, while all but trace quantities of carbon dioxide and any existing nitrogen are exhausted. Additionally, the proportions of the hydrogen and water injected can be varied independently of each other. For example the amount of hydrogen injected into the SOFC fuel inlet can be increased while the water injected into the SOFC fuel inlet is reduced or vice versa. Also the hydrogen and water injected into the SOFC fuel inlet can both be increased or decreased together, but to different degrees. In summary, a complete and independent flow rate control of injected hydrogen and water into the SOFC fuel inlet stream is possible while blocking the injection of carbon dioxide and nitrogen into the fuel inlet stream.

By selecting a high hydrogen flow rate and a lower water flow rate from the anode exhaust gas for circulation into the SOFC fuel inlet, the suppression of manifold methane/steam reforming within the fuel inlet manifold results. At the same time, the high hydrogen content of the SOFC fuel inlet enhances the fuel cell oxidation reaction and encourages a leveling of the in-cell methane/steam reforming. The combination of the endothermic methane/steam reforming reaction with the exothermic SOFC fuel cell reaction, within the cell active area, produces about half the net heat normally produced by just the SOFC fuel cell.

Since the heat generated by the fuel cell is primarily rejected from the SOFC with the cathode air flow, this flow rate can be reduced by about half. This has a positive impact on the parasitic power for the air blower and the size of the air heat exchanger.

In a first preferred embodiment of the SOFC system with a selective anode tail gas circulation, the water (such as water vapor) and hydrogen are recovered from the fuel exhaust or outlet stream in separate stages using separate devices. The water is transferred from the anode exhaust to the SOFC inlet fuel using a rotating desiccant enthalpy wheel. The rate of the water transferred within the enthalpy wheel is controlled by the rotational speed. The water circulation is preferably controlled without using aspirators or blowers.

Also in the first embodiment of the SOFC with selective anode tail gas circulation, the hydrogen is transferred from the anode exhaust to the SOFC fuel inlet stream using an electrochemical hydrogen pump. The rate of hydrogen transferred within the electrochemical hydrogen pump is directly proportional to the cell current. The hydrogen circulation is preferably controlled without using aspirators or blowers.

In the second embodiment of the SOFC system with selective anode tail gas circulation, the hydrogen and water are independently separated from the SOFC anode exhaust using thermally driven absorption/adsorption processes. The circulation flow rate of the hydrogen and water are controlled by mechanical devices such as blowers and/or pumps. The high quality waste heat of the SOFC allows the separation of exhaust gas species without significant parasitic electric power usage.

The SOFC system 10 of the first preferred embodiment is shown in FIG. 1 as a simplified system schematic. The SOFC of system 10 includes a cathode chamber 14, a cathode electrode 15, a ceramic electrolyte 16, an anode electrode containing an anode catalyst 17 and an anode chamber 27. While only one SOFC is shown in FIG. 1 for clarity, it should be understood that the system 10 preferably contains a stack of SOFCs. The SOFC system 10 also contains a fuel supply inlet conduit (i.e., an anode inlet conduit) containing conduit portions 20, 22, 24 and 26, and a fuel exhaust outlet conduit (i.e., an anode outlet conduit) containing conduit portions 28, 29, 30 and 31.

The SOFC system 10 also contains a hydrogen recovery unit 21 which transfers hydrogen gas from within a gas mixture into a secondary gas stream. The hydrogen recovery unit 21 may be any suitable selective hydrogen recovery device. Preferably, unit 21 is a device based on an electrochemical proton exchange process (i.e., an electrochemical proton exchange pump), such as a polymeric or ceramic proton exchange membrane, or a device which uses pressure swing adsorption for selective hydrogen recovery. The SOFC system 10 also contains a water vapor and enthalpy recovery unit 23. The water vapor and enthalpy recovery unit 23 may be any device which selectively transfers water vapor from one gas stream to a secondary gas stream. The water vapor and enthalpy recovery unit 23 is preferably a device which contains a rotating desiccant wheel (also known as an enthalpy wheel) or cyclic desiccant beds. The rate of rotation of the desiccant wheel controls the amount of water vapor transferred by the device. Heat exchanger 25 is a counter flow gas-gas heat exchanger.

The units 21 and 23 are operatively connected to the fuel supply inlet conduit and to the fuel exhaust outlet conduit. Thus, the units 21 and 23 are either directly connected to the inlet and outlet conduits or indirectly connected to the inlet and outlet conduits by respective water and hydrogen delivery conduits. A method of operating the system 10 is described below.

As shown in FIG. 1, air containing reactant oxygen is delivered by a blower (not shown) to the cathode heat exchanger 12 through conduit 11. Within the cathode heat exchanger 12 fuel cell waste heat is exchanged into the cathode inlet air raising the air temperature close to the cell operating temperature. The heated air is then delivered to the cathode chamber 14 through conduit 13. Within the cathode chamber 14 the oxygen gas within the air contacts the cathode electrode 15 and becomes oxygen ions with the addition of electrons. The oxygen ions pass through the solid oxide electrolyte 16 and are available on the anode catalyst 17 to oxidize available fuel. As the air flows through the cathode chamber 14 the air is partly depleted of oxygen and its temperature is increased from the waste heat generated within the fuel cell. The temperature rise across the cathode chamber can be as much as 200 C depending on the fuel cell current, operating voltage, degree of internal fuel reforming and the flow rates of the exhaust gases. The cathode air exhaust from cathode chamber 14 is directed back to the cathode heat exchanger 12 through conduit 18. Within heat exchanger 12, heat is transferred from the exhaust air stream to the air inlet stream in a counter flow arrangement. The cooled exhaust air is then discharged from heat exchanger 12 through conduit 19.

A hydrocarbon fuel, such as methane gas and/or another suitable hydrocarbon or hydrogen gas, is introduced into the SOFC system 10 through conduit 20 into hydrogen recovery unit 21. The fuel may be located in a fuel storage vessel, such as a methane storage vessel, connected to conduit 20. Within hydrogen recovery unit 21 hydrogen gas is transferred from the outlet stream (i.e., the fuel exhaust stream) into the hydrocarbon fuel inlet stream. This hydrogen supports a uniform methane reformation process within the anode catalyst 17. The methane and hydrogen mixture (i.e., the fuel inlet stream) flows from the hydrogen recovery unit 21 into the enthalpy recovery unit 23 through conduit 22.

Within the water vapor and enthalpy recovery unit 23, a portion of the water vapor is transferred from the exhaust or outlet stream into the methane hydrogen inlet stream. From the water vapor and enthalpy recovery unit 23, the methane, hydrogen and water vapor mixture (i.e., the inlet stream) is introduced into heat exchanger 25 through conduit 24. In the heat exchanger 25, the gas mixture temperature is increased near to the operational temperature of about 600 to 1000 C, such as 800 C, using the high temperature waste heat from the exhaust stream. From heat exchanger 25, the hot mixture of methane, hydrogen, and water vapor (i.e., the inlet stream) is delivered to the anode chamber 27 through conduit 26. Some steam reformation of the methane will occur in the heat exchanger 25 and conduit 26, but the amount is suppressed by the existence of the hydrogen. The completion of the steam reforming of the methane is accomplished in the anode catalyst 17.

Within the anode catalyst 17, the steam reforming of methane and the oxidation of carbon and hydrogen in the fuel cell reactions convert the discharged gas mixture to carbon dioxide, additional water vapor, and excess hydrogen. The discharged gas mixture (i.e., the exhaust or outlet stream) flows to heat exchanger 25 through conduit 28, releasing waste heat. The discharged gas mixture (i.e., the exhaust or outlet stream) then flows through conduit 29 to the enthalpy recovery unit 23 to supply a portion of the water vapor to support the input methane reformation. The discharged gas mixture (i.e., the exhaust stream) is then directed to the hydrogen recovery unit 21 through conduit 30, where a selected amount of the hydrogen is transferred to the methane inlet stream. Using the electrochemical proton exchange process as the hydrogen recovery unit 21 is preferred because it provides a measure of the hydrogen content within the discharged gas mixture which can be used to adjust the input methane flow rate. However, other hydrogen recovery devices may also be used. Preferably, the hydrogen recovery unit 21 is located separately from the water vapor and enthalpy recovery unit 23 and the hydrogen recovery unit is located further downstream from the water vapor and enthalpy recovery unit relative to the solid oxide fuel cell stack, such that hydrogen is introduced into the fuel inlet stream before water vapor. The exhaust stream from hydrogen recovery unit 21, containing mostly carbon dioxide, water, and a small quantity of non-reacted fuel, is discharged from the SOFC system 10 through conduit 31.

Figure 2:
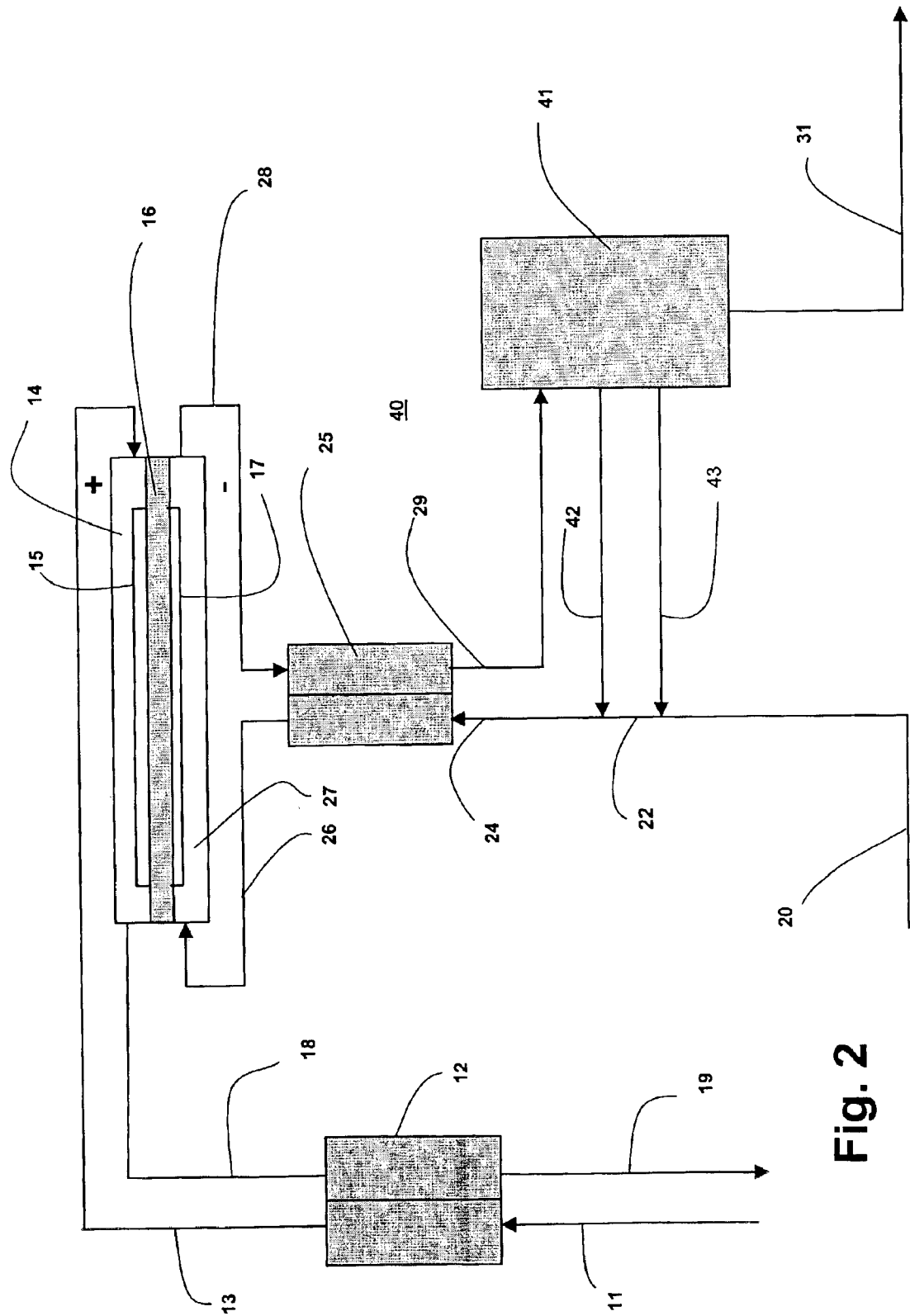
FIG. 2 is a system schematic of the major SOFC components of the second preferred embodiment of the present invention.

The SOFC system 40 of the second preferred embodiment is shown in FIG. 2 as a simplified system schematic. System 40 contains the same components as system 10 of the first embodiment, except that the hydrogen recovery unit 21 and the water vapor and enthalpy recovery unit 23 are replaced with a fuel exhaust processing subsystem 41. The subsystem 41 is operatively (i.e., directly or indirectly) connected to the fuel supply inlet conduit and to the fuel exhaust outlet conduit. The SOFC system 40 also contains a fuel supply inlet conduit (i.e., an anode inlet conduit) containing conduit portions 20, 22, 24 and 26 (conduit portions 20, 22 and 24 may comprise a single continuous conduit, if desired) and a fuel exhaust outlet conduit (i.e., an anode outlet conduit) containing conduit portions 28, 29 and 31. Hydrogen deliver conduit 43 and water vapor delivery conduit 42 connect the subsystem 41 with the fuel supply inlet conduit.

The fuel exhaust processing subsystem 41 preferably contains a carbon dioxide scrubbing unit, a water vapor recovery unit and a hydrogen recovery unit. The carbon dioxide scrubbing unit removes at least a portion of carbon dioxide present in the fuel exhaust to form a scrubbed fuel exhaust or outlet stream. The water vapor recovery unit transfers at least a portion of water vapor from the scrubbed exhaust stream to the hydrocarbon fuel inlet stream. The hydrogen recovery unit is adapted to transfer at least a portion of hydrogen from the scrubbed fuel exhaust stream to the hydrocarbon fuel inlet steam. Thus, in the system of the second preferred embodiment, a single subsystem 41 can be used to separate hydrogen and water vapor from the fuel exhaust or outlet stream. Preferably, the subsystem 41 is an absorption/adsorption gas recovery and separation subsystem which separates hydrogen and water vapor based on absorption/adsorption techniques, such as a device containing an adsorption based gas separation column and/or a polymeric gas separation membrane. Alternatively, the subsystem 41 may comprise a molecular sieve.

Preferably, a carbon dioxide scrubbing unit is used to remove at least a portion of carbon dioxide from the exhaust stream prior to separating the water vapor and hydrogen from the exhaust stream. Thus, the method of the second preferred embodiment preferably includes removing at least a portion of carbon dioxide present in the fuel exhaust or outlet stream to form a scrubbed fuel exhaust and providing at least a portion of the scrubbed fuel exhaust into the hydrocarbon fuel inlet stream, such as providing a portion of hydrogen and water vapor from the scrubbed fuel exhaust into the fuel inlet stream. Preferably, about 45% to about 55%, such as about 50% of the hydrogen and water vapor recovered from the scrubbed fuel exhaust are provided separately into the hydrocarbon fuel inlet stream to obtain a fuel utilization of about 70 to about 80%.

A method of operating the system 40 is described with respect to FIG. 2. Air containing reactant oxygen is delivered by a blower (not shown) to the cathode heat exchanger 12 through conduit 11. Within the cathode heat exchanger 12, fuel cell waste heat is exchanged into the cathode inlet air raising the air temperature close to the cell operating temperature. The heated air is then delivered to the SOFC cathode chamber 14, through conduit 13. Within the cathode chamber 14, the oxygen gas within the air contacts the cathode electrode 15 and becomes oxygen ions with the addition of electrons. The oxygen ions pass through the solid oxide electrolyte 16 and are available on the anode catalyst 17 to oxidize available fuel. As the air flows through the cathode chamber 14 the air is partly depleted of oxygen and its temperature is increased from the waste heat generated within the fuel cell. The temperature rise across the cathode chamber can be as much as 200 C depending on the fuel cell current, operating voltage, degree of internal fuel reforming and the flow rates of the exhaust gases. The cathode air exhaust from cathode chamber 14 is directed back to the cathode heat exchanger 12 through conduit 18. Within heat exchanger 12 heat is transferred from the exhaust air stream to the air inlet stream in a counter flow arrangement. The cooled exhaust air is then discharged from heat exchanger 12 through conduit 19.

A hydrocarbon fuel, such as methane gas, is introduced into the SOFC system 40 through conduit 20. Hydrogen is injected into the methane gas inlet stream through conduit 43. This hydrogen supports a uniform methane reformation process within the anode catalyst 17. The methane and hydrogen mixture (i.e., inlet stream) flows through conduit 22. Water is injected into inlet stream through conduit 42 and the methane, hydrogen and water mixture (i.e., the inlet stream) flows through conduit 24 to heat exchanger 25. In the heat exchanger 25, the mixture temperature is increased near to an operational temperature of about 600 C to about 1000 C, such as about 800 C, using the high temperature waste heat from the exhaust stream. From heat exchanger 25, the hot mixture of methane, hydrogen, and water vapor (i.e., the inlet stream) is delivered to the SOFC anode chamber 27 through conduit 26. Some steam reformation of the methane will occur in the heat exchanger 25 and conduit 26 but the amount is suppressed by the existence of the hydrogen. The completion of the steam reforming of the methane is accomplished in the anode catalyst 17.

Within the anode catalyst 17, the steam reforming of methane and the oxidation of carbon and hydrogen in the fuel cell reactions convert the discharged gas mixture (i.e., the exhaust stream) to carbon dioxide, additional water vapor, and excess hydrogen. The discharged gas mixture (i.e., the exhaust stream) flows to heat exchanger 25 through conduit 28, releasing waste heat. The exhaust stream then flows through conduit 29 to fuel exhaust processing subsystem 41. The fuel exhaust processing subsystem 41 separates hydrogen and water from carbon dioxide and other non-reacted fuel using absorption/adsorption or other suitable techniques. A portion of the separated water is injected into a water vapor delivery conduit 42 to supply water into the fuel inlet stream flowing through conduit 22 to support the input methane reformation. The separated hydrogen is injected into a hydrogen delivery conduit 43 to supply hydrogen into the fuel inlet stream flowing through conduit 22 to modify the methane steam reforming equilibrium. Preferably, the water vapor delivery conduit 42 is located further upstream from the hydrogen delivery conduit 43 relative to the solid oxide fuel cell stack, such that the hydrogen is delivered into the fuel inlet stream before water vapor. The exhaust mixture from fuel exhaust processing subsystem 41, containing mostly carbon dioxide, water, and a small quantity of non-reacted fuel, is discharged from the SOFC system 40 through conduit 31.

In the methods of the first and second preferred embodiment, hydrogen may be provided into the fuel inlet stream without providing carbon dioxide which is present in the fuel exhaust stream into the fuel inlet stream. Furthermore, if desired, only a portion of the hydrogen and/or water vapor present in the fuel exhaust stream may be provided into the fuel inlet stream. The methods and systems of the first and second preferred embodiments allow control of an amount of water vapor provided into the hydrocarbon fuel to decrease or prevent reforming of the hydrocarbon fuel and water vapor in a fuel inlet conduit upstream from the solid oxide fuel cell stack. The control of the water vapor transfer may be achieved by the rotation rate of a desiccant wheel of the first embodiment or control of the absorption/adsorption cycle of the second embodiment. For example, the methods of the first and second preferred embodiments may be controlled to provide a sufficient amount of water vapor into the hydrocarbon fuel inlet stream such that the water vapor and hydrocarbon fuel mixture inlet stream contains less than two water molecules for each carbon atom, preferably 1.5 or less water molecules for each carbon atom. The hydrocarbon fuel and the water vapor can be reformed in the solid oxide fuel cell stack in parallel with an oxidation reaction proceeding in the solid oxide fuel cell stack. Preferably, about 45% to about 55%, such as about 50% of the hydrogen and water vapor recovered from the scrubbed fuel exhaust are provided separately into the hydrocarbon fuel inlet stream to obtain a fuel utilization of about 70 to about 80%. The term "about" provides a variation based on given processes variables, such as a variation of 10% or less, preferably 5% or less.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

I claim:

1. A solid oxide fuel cell system, comprising:
   a solid oxide fuel cell stack;
   a fuel supply inlet conduit adapted to provide a hydrocarbon fuel inlet stream toward the solid oxide fuel cell stack;
   a fuel exhaust outlet conduit adapted to remove a fuel exhaust stream from the solid oxide fuel cell stack;
   a water vapor and enthalpy recovery unit either directly connected or indirectly connected via a water supply conduit to the fuel supply inlet conduit and to the fuel exhaust outlet conduit, wherein the water vapor and enthalpy recovery unit is adapted to selectively transfer at least a portion of water vapor and heat from the fuel exhaust stream to the hydrocarbon fuel inlet stream; and
   a hydrogen recovery unit connected to the fuel supply inlet conduit and to the fuel exhaust outlet conduit, wherein the hydrogen recovery unit is adapted to selectively transfer at least a portion of hydrogen from the fuel exhaust stream to the hydrocarbon fuel inlet stream.

2. The system of claim 1, wherein the water vapor and enthalpy recovery unit comprises an enthalpy wheel.

3. The system of claim 1, wherein the hydrogen recovery unit comprises an adsorption hydrogen recovery device or an electrochemical pump, which are adapted to selectively recover hydrogen but not carbon dioxide from the fuel exhaust stream.

4. The system of claim 1, wherein:
   the hydrogen recovery unit is located separately from the water vapor and enthalpy recovery unit; and
   the hydrogen recovery unit is located further downstream from the water vapor and enthalpy recovery unit relative to the solid oxide fuel cell stack.

5. The system of claim 1, further comprising:
   a heat exchanger connected to the fuel supply inlet conduit and to the fuel exhaust outlet conduit, wherein the heat exchanger is adapted to transfer heat from the fuel exhaust stream to the hydrocarbon fuel inlet stream.

6. The system of claim 1, wherein the water vapor and enthalpy recovery unit is directly connected to the fuel supply inlet conduit and to the fuel exhaust outlet conduit.

7. The system of claim 1, wherein the water vapor enthalpy recovery unit is indirectly connected via water supply conduits to the fuel supply inlet conduit and to the fuel exhaust outlet conduit.

8. The system of claim 1, wherein the hydrogen recovery unit is directly connected to the fuel supply inlet conduit and to the fuel exhaust outlet conduit.

9. The system of claim 1, wherein the hydrogen recovery unit is indirectly connected via hydrogen supply conduits to the fuel supply inlet conduit and to the fuel exhaust outlet conduit.

10. A solid oxide fuel cell system, comprising:

a solid oxide fuel cell stack;

a fuel supply inlet conduit adapted to provide a hydrocarbon fuel inlet stream toward the solid oxide fuel cell stack;

a fuel exhaust outlet conduit adapted to remove a fuel exhaust stream from the solid oxide fuel cell stack;

a water vapor unit either directly connected or indirectly connected via a water supply conduit to the fuel supply inlet conduit, wherein the water vapor unit is adapted to selectively provide water vapor to the hydrocarbon fuel inlet stream; and a hydrogen recovery unit connected to the fuel exhaust outlet conduit, wherein the hydrogen recovery unit is adapted to recover hydrogen from the fuel exhaust stream.

11. The system of claim 10, wherein the hydrogen recovery unit comprises an adsorption hydrogen recovery device.

12. The system of claim 10, wherein the water vapor unit comprises a water vapor and enthalpy recovery unit which is adapted to provide enthalpy from the fuel exhaust stream to the hydrocarbon fuel inlet stream.

13. The system of claim 10, comprising a heat exchanger connected to the fuel supply inlet conduit and to the fuel exhaust outlet conduit, wherein the heat exchanger is adapted to transfer heat from the fuel exhaust stream to the hydrocarbon fuel inlet stream.

14. The system of claim 10, wherein the hydrogen recovery unit is adapted to selectively transfer at least a portion of hydrogen from the fuel exhaust stream to the hydrocarbon fuel inlet stream.

15. The system of claim 10, wherein the hydrogen recovery unit comprises an electrochemical pump hydrogen recovery device.

16. The system of claim 10, wherein:

the hydrogen recovery unit is located separately from the water vapor unit; and the hydrogen recovery unit is located further downstream from the water vapor unit relative to the solid oxide fuel cell stack.

17. The system of claim 10, wherein the water vapor unit is directly connected to the fuel supply inlet conduit.

18. The system of claim 10, wherein the water vapor unit is indirectly connected via a water supply conduit to the fuel supply inlet conduit.

19. The system of claim 10, wherein the hydrogen recovery unit is directly connected to the fuel exhaust outlet conduit.

20. The system of claim 10, wherein the hydrogen recovery unit is indirectly connected via a hydrogen supply conduit to the fuel exhaust outlet conduit.

21. A solid oxide fuel cell system, comprising:

a solid oxide fuel cell stack;

a first means for providing a hydrocarbon fuel inlet stream toward the solid oxide fuel cell stack;

a second means for removing a fuel exhaust stream from the solid oxide fuel cell stack;

a third means for selectively providing water vapor to the hydrocarbon fuel inlet stream; and a fourth means for recovering hydrogen from the fuel exhaust stream.

22. The system of claim 21, wherein the fourth means comprises an adsorption hydrogen recovery device.

23. The system of claim 21, wherein the third means is a means for providing enthalpy from the fuel exhaust stream to the hydrocarbon fuel inlet stream.

24. The system of claim 21, wherein:

the fourth means is located separately from the third means; and the fourth means is located further downstream from the third means relative to the solid oxide fuel cell stack.

25. The system of claim 21, further comprising a heat exchanger connected to the first and the second means, wherein the heat exchanger is adapted to transfer heat from the fuel exhaust stream to the hydrocarbon fuel inlet stream.

26. The system of claim 21, wherein the fourth means is a means for selectively transferring at least a portion of hydrogen from the fuel exhaust stream to the hydrocarbon fuel inlet stream.

27. The system of claim 21, wherein the fourth means comprises an electrochemical pump hydrogen recovery device.

* * * * *

UNITED STATES PATENT AND TRADEMARK OFFICE
CERTIFICATE OF CORRECTION

PATENT NO. : 6,924,053 B2  Page 1 of 1
DATED : August 2, 2005
INVENTOR(S) : James Frederick McElroy It is certified that error appears in the above-identified patent and that said Letters Patent is hereby corrected as shown below:

<u>Title page, Item [54] and Column 1, line 1,</u>
Title, please correct to read:
-- SOLID OXIDE FUEL CELL WITH SELECTIVE ANODE TAIL GAS CIRCULATION --.

Signed and Sealed this

Eleventh Day of October, 2005

JON W. DUDAS
*Director of the United States Patent and Trademark Office*